(12) United States Patent
Rehtanz et al.

(10) Patent No.: US 8,190,379 B2
(45) Date of Patent: May 29, 2012

(54) VERIFYING AN ACCURACY OF A STATE ESTIMATION

(75) Inventors: Christian Rehtanz, Baden-Dätwill (CH); Andreas Suranyi, Würenlos (CH); Joachim Bertsch, Kilchberg (CH); Marek Zima, Zurich (CH)

(73) Assignee: ABB Technology AG, Zurich (CI)

( * ) Notice: Subject to any disclaimer, the term of this patent is extended or adjusted under 35 U.S.C. 154(b) by 944 days.

(21) Appl. No.: 12/115,713

(22) Filed: May 6, 2008

(65) Prior Publication Data
US 2008/0262758 A1   Oct. 23, 2008

Related U.S. Application Data

(63) Continuation of application No. PCT/CH2006/000567, filed on Oct. 12, 2006.

(51) Int. Cl.
*G01R 15/00* (2006.01)
(52) U.S. Cl. ........................................................ 702/57
(58) Field of Classification Search ...................... 702/57
See application file for complete search history.

(56) References Cited

U.S. PATENT DOCUMENTS
5,627,760 A      5/1997  Slutsker et al.
6,313,752 B1 *  11/2001  Corrigan et al. .............. 340/657

FOREIGN PATENT DOCUMENTS
EP   1 489 714 (A1)   12/2004

OTHER PUBLICATIONS

James McCalley et al., A New Methodology for Determining Transmission Capacity Margin in Electric Power Systems, 1991, IEEE, Transactions on Power Systems.*
Form PCT/ISA/210 (International Search Report) dated Jan. 29, 2007.
Form PCT/ISA/237 (Written Opinion of the International Searching Authority) dated Jan. 29, 2007.
European Search Report dated Apr. 19, 2006.
David G. Hart et al., "PMUs—A New Approach to Power Network Monitoring", ABB Review 1, 2001, pp. 58-61.
A. Abur et al., "Power System State Estimation: Theory and Implementation", Textbook, Chapters 1 and 2, pp. 1-33, Marcel Dekker, New York, 2004.

* cited by examiner

*Primary Examiner* — Drew A Dunn
*Assistant Examiner* — Stephen Cherry
(74) *Attorney, Agent, or Firm* — Buchanan Ingersoll & Rooney PC

(57) ABSTRACT

The present disclosure is concerned with the reduction of an operational security margin of a power system without jeopardizing the safety of the power system or incurring heavy investments. According to the disclosure, a check for basic accuracy or correctness of a conventional State Estimation (SE) procedure allows to increase a level of confidence in the results of the procedure. To this end, an accuracy of the estimated states is verified by comparing the latter with the results (y, y') of independent phasor measurements performed at selected locations of the power system. Unless a discrepancy is reported by this comparison, the results of the SE can be assumed to be sufficiently accurate, and any conservative or additional security margin intended to compensate for SE uncertainty can be relaxed. Hence, established trustworthiness in the estimated states allows increasing the transmitted power where the estimated states do indicate such a possibility, i.e. in particular in fringe areas and/or transmission corridors between countries, and especially under stressed network conditions.

8 Claims, 1 Drawing Sheet

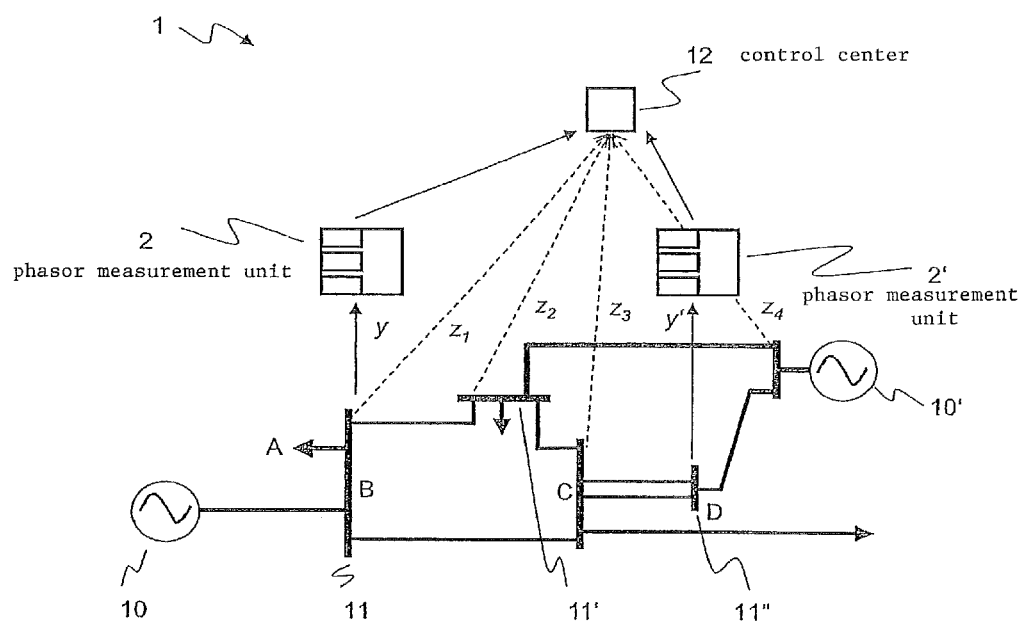

VERIFYING AN ACCURACY OF A STATE ESTIMATION

RELATED APPLICATIONS

This application claims priority under 35 U.S.C. §119 to EP Application 05405624.7 filed in Europe on Nov. 8, 2005, and as a continuation application under 35 U.S.C. §120 to PCT/CH2006/000567 filed as an International Application on Oct. 12, 2006 designating the U.S., the entire contents of which are hereby incorporated by reference in their entireties.

TECHNICAL FIELD

The disclosure relates to the field of electric power systems and their optimal operation. It is based on a procedure for estimating a number of states of such a power system.

BACKGROUND INFORMATION

Electric power systems comprise power transmission networks interconnecting geographically separated regions, and substations for transforming voltages and for switching connections between individual lines of the network. Power generation and load flow in a system with several substations is managed by a central Energy Management System (EMS) and supervised by a Supervisory Control And Data Acquisition (SCADA) system. In the past years, continued load growth without a corresponding increase in transmission resources has resulted in an increased pressure to reduce operational security margins for many power systems world wide and to operate the power systems ever closer to their stability limits. These issues together with the on-going worldwide trend towards deregulation of the electric power markets in general have created a need for accurate and better network monitoring, protection and control.

In the past, only root mean square (RMS) values of voltages, currents, active power and reactive power flowing in the network have been determined in an unsynchronized way by means of conventional instrument transformers. Recently however, devices and systems for measuring voltage and current phasors at different locations of a network at exactly the same time have become available. Phasors are time-stamped, complex values such as amplitude and phase angle, of local electric quantities such as currents, voltages and load flows, and can be provided by means of Phasor Measurement Units (PMU) as presented e.g. in the article "PMUs—A new approach to power network monitoring", ABB Review January 2001, p. 58. These units comprise a very accurate time reference, achievable e.g. by using Global Positioning Satellite (GPS) system and allowing synchronization of the time-stamped values from different locations. In an exemplary application for so-called wide-area monitoring, a number of PMUs forward their measured phasor values to a centrally located system monitoring centre. Data exchange can further be established between the system monitoring centre and other control and protection systems such as the SCADA system mentioned above, to allow for optimal data sharing and control actions.

An integral part of the aforementioned SCADA/EMS systems is the so-called State Estimation (SE) as described e.g. in chapters 1 and 2 (pages 1 to 33) of the textbook entitled "Power System State Estimation: Theory and Implementation" by A. Abur and A. G. Exposito (Marcel Dekker, New York 2004). SE involves a regular update of the most important quantities characterizing the power system, such as line flows, loads, generator outputs or bus voltages. Some of these quantities, e.g. transmission line flows, may not be observed directly, but can be derived from information about a topology and a number of states $\underline{x}$ of the power system. For example, these states $\underline{x}$ can be the magnitude and phase angle of bus voltages of all the buses of the power system. In short, the operating conditions or the static state of a power system at a given point in time can be determined if the network model and complex phasor voltages at every system bus are known.

As before the advent of phasor measurements, phase angles could not be measured due to lack of synchronization of measurement devices, SE was devised as a mathematical procedure for extracting the states $\underline{x}$ of the power system from a set of measurements $\underline{z}$, such as voltage magnitudes V; line active P and reactive Q power flows. However, various types of additive errors and uncertainties $\underline{v}$ tend to influence these measurements.

$$\underline{z} = \underline{h}(\underline{x}) + \underline{v}$$

Accordingly, the main feature of SE is a minimization of the impact of the errors v with help of redundant measurements. Typically, at a particular point in time, more measurements $\underline{z}$ are taken than the number of state variables to be determined. In this case, the above equation represents an over-determined set of nonlinear equations, for which a least-squares solution yields the vector $\underline{x}$ which minimizes the sum of the squares of the components of a residual vector. Generally, the situation is even more complicated since relationships between states and measurements are nonlinear, and the least squares solution of such a nonlinear estimation problem can only be obtained iteratively. Provided that there is enough redundancy in the measurement configuration, the existence of gross errors in the measurement set or structural errors in the network configuration can even be detected this way.

State estimation is based on the assumption that measurement errors are statistically distributed with zero mean. The major sources of such errors are a) the instrument transformers, b) the cables connecting the instrument transformers to the sensors and c) the sensors themselves. Furthermore, sub-optimal synchronization between different sensors introduces an additional uncertainty in the measurements.

The key ingredients to SE, apart from the measurements $\underline{z}$ mentioned above, are the network parameters and the actual network topology, comprising in particular updated information about every single component such as switches, breakers and transformers that are susceptible of changing a status. To this end, SE includes a topology processor that gathers status data about the circuit breakers and switches, and configures the one-line diagram of the system. Nevertheless, errors in the network topology and parameters do exist occasionally, due to unreported outages or transmission line sags on hot days.

Accordingly, the topology of the network needs to be updated automatically or manually depending on the switching status of the devices (line in or out e.g. for service or after a fault), and new network elements need to be added to the SE system after their installation in the power system. Likewise, potential problems with SE arise from those network parameters that are changing over time with ambient conditions (e.g. temperature, radiation) or from aging devices. Obviously, if the topology is not maintained carefully in the system, the SE results are inaccurate.

Generally, the SE assumes that the power system is in a steady-state situation. In transient situations, e.g. after a series of faults, the topology and the measurement values may appear to be incoherent, and the iterative procedure may be found to converge in an unsatisfactory way or not at all.

Furthermore, in fringe areas of a power system, e.g. along remote transmission corridors, the redundancy of measurements is usually not given or weak, with such critical measurements resulting in an unobservable system if eliminated from the measurement set. Insufficient redundancy results in the SE procedure not being able to compensate either bad measurement values or inaccuracies in network parameters.

Among the abovementioned sources of errors or uncertainty, changes in parameters and topology may remain unnoticed by the state estimator. Nevertheless, no indicator or check has been proposed so far to determine if the state estimation procedure for a particular power system is basically correct or suffering from a serious bias due to an undiscovered change in parameter or topology.

Recently, Phasor Measurement Units (PMU) were proposed to serve as data sources for state estimation, e.g. for increasing the accuracy by adding additional redundant measurements. Obviously, if all the conventional sensors were replaced by PMUs, the angles of the voltages and currents of interest could be directly measured, and the update interval between subsequent sets of measurements reduced from several minutes to a fraction of a second. In this case, the subsequent SE procedure for deriving the most likely states $\underline{x}$ would be linear and thus decisively simplified:

$$\underline{z} = \underline{H} \cdot \underline{x} + \underline{v},$$

However, equipping all network nodes with PMUs for the sole purpose of SE is not realistic.

SUMMARY

Exemplary embodiments disclosed herein can reduce operational security margins of a power system and to increase the power transmittable through a transmission corridor of the power system without jeopardizing the safety of the power system or incurring heavy investments. A method of and an arrangement for verifying an accuracy of a state estimation procedure are disclosed.

A method of verifying an accuracy of a State Estimation (SE) procedure is disclosed estimating a number of states (x) of an electric power system based on a redundant set of measurements (z) and corresponding errors (v), wherein the states (x) correspond to system quantities at a number of locations of the system, wherein the method comprises measuring a phasor value (y, y') of a system quantity at a location of the system, and comparing the measured phasor value (y, y') with the estimated state (x) corresponding to the respective system quantity at the location of the phasor measurement.

An arrangement for verifying an accuracy of a State Estimation (SE) procedure is disclosed estimating a number of states (x) of an electric power system based on a redundant set of measurements (z) and corresponding errors (v), wherein the states (x) correspond to system quantities at a number of locations of the system, wherein the arrangement comprises a Phasor Measurement Unit (PMU) for measuring a phasor value (y, y') of a system quantity at a location of the system, and a control centre for comparing the measured phasor value (y, y') with the estimated state (x) corresponding to the respective system quantity at the location of the Phasor Measurement Unit (PMU).

An electric power system configured to verify an accuracy of a state estimation procedure estimating a number of states (x) of the electric power system based on a redundant set of measurements (z) and corresponding errors (v) is disclosed. The states (x) correspond to system quantities at a number of locations of the system, the electric power system comprising: means to measure a phasor value (y, y') of a system quantity at a location of the system; and means to compare the measured phasor value (y, y') with the estimated state (x) corresponding to the respective system quantity at the location of the phasor measurement.

BRIEF DESCRIPTION OF THE DRAWINGS

The subject matter of the disclosure will be explained in more detail in the following text with reference to exemplary embodiments which are illustrated in the attached drawing, wherein:

FIG. 1 is a one-line diagram of an exemplary power system.

The reference symbols used in the drawing, and their meanings, are listed in summary form in the list of reference symbols. In principle, identical parts are provided with the same reference symbols in the figures.

DETAILED DESCRIPTION

According to the disclosure, a check for basic accuracy or correctness of a conventional State Estimation (SE) procedure allows to increase a level of confidence in the results of the procedure. To this end, an accuracy of the estimated states is verified by comparing the latter with the results of independent phasor measurements performed at selected locations of the power system. Unless a discrepancy is reported by this comparison, the results of the SE can be assumed to be sufficiently accurate, and any conservative or additional security margin intended to compensate for SE uncertainty can be relaxed. Hence, established trustworthiness in the estimated states allows increasing the transmitted power where the estimated states do indicate such a possibility, i.e. in particular in fringe areas and/or transmission corridors between countries, and especially under stressed network conditions.

In an exemplary embodiment, phasor measurements from two or more PMUs located at distinct substations of the power system are evaluated to indicate the correctness of the SE procedure. Dependent system quantities such as a voltage phase angle difference are determined and compared to a phase angle difference obtained from two estimated states. Hence a single comparison of one system quantity derived from phasor and SE values originating from electrically distant locations yields a refined indication about the accuracy of the state estimation procedure.

In another exemplary embodiment of the disclosure, a discrepancy threshold or measure is defined and evaluated for verification. If this threshold is not exceeded, security margins for transmission sections e.g. between substations, may be reduced. Otherwise, a warning or other indication may be issued.

FIG. 1 shows a one-line diagram of a 5-bus power system 1 including two generators 10, 10' and several substations represented by five busses 11, 11', . . . and interconnected by a number of transmission lines. A set of conventional sensors (not shown) are provided, four of which are assumed to be located at four of the busses 11, 11', . . . and do provide measurements $z_1$, $z_2$, $z_3$, $z_4$ that are transmitted to and exploited in a control, network management or system monitoring centre 12 (broken lines). The totality of measurements z received at the control centre 12 include line power flows, bus voltage and line current magnitudes, generator outputs, loads, circuit breaker and switch status information, transformer tap positions, and switchable capacitor bank values. From this totality of measurements z, an optimal estimate for the system state, comprising complex bus voltages at various locations A, B, C, D in the entire power system, is determined by means of a known State Estimation (SE) procedure. SE also provides estimates for all the line flows, loads, transformer taps, generator outputs and other dependent system quantities.

Two phasor measurement units (PMU) 2, 2' associated to two distinct substations 11, 11" are shown and do provide system quantity values y, y' such as voltage or current phasors. These phasors are likewise transmitted to the control centre 12 (dotted arrows), where they are compared with the system states estimated by the SE for the respective locations A, D corresponding to the substations 11, 11". Likewise, values of dependent system quantities like a phase angle difference $\Delta\phi$ derived from the two phasor values y, y' are compared to the values of the dependent system quantity calculated from the estimated states. If the outcome of this consistency check is positive, the operator may trust all the results of the SE, and hence reduce security margins for transmission sections e.g. between substations A and C.

The locations A, D where the PMUs are positioned are to be well-selected and comprise e.g. critical busses or line feeders in substations. The PMU data y, y' itself may or may not, either partly or completely, be incorporated in the state estimation procedure. It is further to be understood that neither the conventional sensors nor the PMUs 2, 2' need to be implemented in one single or dedicated device, as the respective measuring functions are being executable likewise by an intelligent electronic device provided for protection and control tasks in the system 1. Furthermore, the location of the control centre 12 could be identical with one of the sensors, PMUs or IEDs mentioned.

A threshold or other discrepancy measure $\epsilon$ can be defined for the comparison of the measured phasors y, y' and the values provided by the SE procedure. Possible exemplary embodiments range from a simple comparison of the difference between the values mentioned with the threshold, to various methods of statistical mathematics including variance computations. For example, a difference between the respective voltage and current magnitudes and angles as complex state variables from PMU $y_{i,PMU}$ and SE $x_{i,SE}$ is calculated.

$$\text{If} |x_{i,SE} - y_{i,PMU}| \geq \epsilon \text{ then indicator} = 1.$$

If the difference is above the threshold $\epsilon$, an indicator flag is set and an optical or acoustical warning signal or error message will be issued to the operator in the control centre. Said signal or message can be beneficially integrated into the SCADA system and screen. In the case a faulty SE is identified an analysis process may be started identifying the cause for the error according to the sources described above (topology, transient, network data, faulty measurement, SE software problem).

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

LIST OF DESIGNATIONS

1 power system
10 generator
11 bus
12 control centre
2 phasor measurement unit

What is claimed is:

1. A method of verifying an accuracy of a State Estimation (SE) procedure estimating a number of states (x) of an electric power system based on a redundant set of measurements (z) and corresponding errors (v), wherein the states (x) correspond to system quantities at a number of locations of the system, the method comprising:
   measuring a phasor value (y, y') of a system quantity at a location of the system;
   comparing the measured phasor value (y, y') with the estimated state (x) corresponding to the respective system quantity at the location of the phasor measurement;
   measuring two phasor values (y, y') at two locations of the system and calculating a value of a first dependent system quantity from the two phasor values; and
   comparing said value of the first dependent system quantity with a respective value of a second dependent system quantity calculated from estimated states corresponding to the respective system quantities at the two locations.

2. The method according to claim 1, comprising: defining a discrepancy threshold between the measured phasor value or a phasor value difference and the estimated state or state difference; and
   generating an alarm if the discrepancy threshold is exceeded.

3. The method according to claim 2, comprising:
   reducing a security margin for operating a transmission line of the power system if the discrepancy measure is not exceeded.

4. The method according to claim 1, comprising:
   defining a discrepancy threshold between the measured phasor value or a phasor value difference and the estimated state or state difference; and
   generating an alarm if the discrepancy threshold is exceeded.

5. An arrangement for verifying an accuracy of a State Estimation (SE) procedure estimating a number of states (x) of an electric power system based on a redundant set of measurements (z) and corresponding errors (v), wherein the states (x) correspond to system quantities at a number of locations of the system, the arrangement comprising:
   a Phasor Measurement Unit (PMU) for measuring a phasor value (y, y') of a system quantity at a location of the system; and
   a control centre for comparing the measured phasor value (y, y') with the estimated state (x) corresponding to the respective system quantity at the location of the Phasor Measurement Unit (PMU), wherein the means to measure is also for measuring two phasor values (y, y') at two locations of the system; and
   means for calculating a value of a first dependent system quantity from the two phasor values; and said value of the first dependent system quantity is compared with the respective value of a second dependent system quantity calculated from the estimated states corresponding to the respective system quantities at the two locations.

6. An electric power system configured to verify an accuracy of a state estimation procedure estimating a number of states (x) of the electric power system based on a redundant set of measurements (z) and corresponding errors (v), wherein the states (x) correspond to system quantities at a number of locations of the system, the electric power system comprising:
   means to measure a phasor value (y, y') of a system quantity at a location of the system wherein the means to measure is also for measuring two phasor values (y, y') are measured at two locations of the system;

means to compare the measured phasor value (y, y') with the estimated state (x) corresponding to the respective system quantity at the location of the phasor measurement, wherein the means to measure is also for measuring two phasor values (y, y') at two locations of the system; and means for calculating a value of a first dependent system quantity from the two phasor values; and said value of the first dependent system quantity is compared with the respective value of a second dependent system quantity calculated from the estimated states corresponding to the respective system quantities at the two locations.

7. The system according to claim 6, wherein: a discrepancy threshold between the measured phasor value or a phasor value difference and the estimated state or state difference is defined; and an alarm is generated if the discrepancy threshold is exceeded.

8. The system according to claim 7, wherein: a security margin for operating a transmission line of the power system is reduced if the discrepancy measure is not exceeded.

* * * * *